(12) United States Patent
Sauter

(10) Patent No.: US 10,876,300 B2
(45) Date of Patent: Dec. 29, 2020

(54) OSB BOARD AND USE OF THE SAME

(71) Applicant: SWISS KRONO Tec AG, Lucerne (CH)

(72) Inventor: Harald Sauter, Albstadt (DE)

(73) Assignee: SWISS KRONO Tec AG, Lucerne (CH)

( * ) Notice: Subject to any disclaimer, the term of this patent is extended or adjusted under 35 U.S.C. 154(b) by 0 days.

(21) Appl. No.: 16/156,171

(22) Filed: Oct. 10, 2018

(65) Prior Publication Data
US 2019/0112820 A1   Apr. 18, 2019

(30) Foreign Application Priority Data
Oct. 13, 2017  (EP) .................................... 17196384

(51) Int. Cl.
| | |
|---|---|
| *E04F 13/08* | (2006.01) |
| *B32B 3/06* | (2006.01) |
| *B32B 21/06* | (2006.01) |
| *B32B 21/02* | (2006.01) |
| *E04C 2/12* | (2006.01) |
| *E04F 13/10* | (2006.01) |

(52) U.S. Cl.
CPC ............ *E04F 13/0896* (2013.01); *B32B 3/06* (2013.01); *B32B 21/02* (2013.01); *B32B 21/06* (2013.01); *E04C 2/12* (2013.01); *E04F 13/0866* (2013.01); *E04F 13/0894* (2013.01); *E04F 13/10* (2013.01); *B32B 2419/06* (2013.01); *B32B 2471/00* (2013.01); *B32B 2607/00* (2013.01); *E04F 13/0864* (2013.01); *E04F 2201/0107* (2013.01); *E04F 2201/0138* (2013.01); *E04F 2201/026* (2013.01); *E04F 2201/07* (2013.01)

(58) Field of Classification Search
CPC .............. E04F 13/0896; E04F 13/0866; E04F 13/0894; E04F 13/10; E04C 2/12
USPC .......................................................... 52/588.1
See application file for complete search history.

(56) References Cited

U.S. PATENT DOCUMENTS

| | | | | |
|---|---|---|---|---|
| 1,575,842 A | * | 3/1926 | Johnston ................. | E04C 2/043 52/596 |
| 2,316,671 A | * | 4/1943 | Crooks ................... | E04F 15/04 52/479 |
| 2,328,051 A | | 8/1943 | Bull | |

(Continued)

FOREIGN PATENT DOCUMENTS

| | | | | |
|---|---|---|---|---|
| DE | 19951812 A1 | * | 7/2000 | ............. B32B 21/13 |
| DE | 102005012042 A1 | | 9/2006 | |

(Continued)

*Primary Examiner* — Patrick J Maestri
*Assistant Examiner* — Joseph J. Sadlon
(74) *Attorney, Agent, or Firm* — The Webb Law Firm

(57) ABSTRACT

The present invention relates to an OSB board with at least two board edges lying opposite one another, in particular two opposite longitudinal edges, where the upper side of the OSB board is provided with at least one layer of a cardboard paper. The board edges respectively on the upper side of the board have a rounding with a radius of between 3 and 10 mm. Each of the two opposite board edges has an offset in form of a simple rebate, the rebate in the one board edge complementing the rebate in the opposite board edge. At least one glue tube in each case is provided in at least one of the opposite offsets of the rebates, in particular in at least one groove.

27 Claims, 3 Drawing Sheets

(56) References Cited

U.S. PATENT DOCUMENTS

| | | | | |
|---|---|---|---|---|
| 2,725,910 A * | 12/1955 | Kahr | ................ | B27M 3/04 |
| | | | | 144/350 |
| 3,034,261 A * | 5/1962 | Hollmann | ............ | E04F 13/007 |
| | | | | 52/553 |
| 3,687,773 A * | 8/1972 | Wangborg | ................ | B27B 1/00 |
| | | | | 156/265 |
| 3,730,820 A * | 5/1973 | Fields | ................ | E04C 2/12 |
| | | | | 428/53 |
| 3,878,657 A * | 4/1975 | Ferver | .................. | E04H 13/00 |
| | | | | 52/139 |
| 4,210,692 A * | 7/1980 | Bohme | ................ | B32B 21/06 |
| | | | | 428/106 |
| 4,287,690 A * | 9/1981 | Berger | ............... | E04B 1/3211 |
| | | | | 52/81.4 |
| 4,471,012 A * | 9/1984 | Maxwell | ............... | B32B 21/13 |
| | | | | 428/106 |
| 4,573,300 A * | 3/1986 | Bezner | .................. | E04C 2/543 |
| | | | | 428/100 |
| 4,697,385 A * | 10/1987 | Zachariasen | ............ | E05D 15/54 |
| | | | | 16/229 |
| 5,218,808 A * | 6/1993 | Ardley | .................. | E04B 9/064 |
| | | | | 52/506.08 |
| 5,274,979 A * | 1/1994 | Tsai | ............... | E04C 2/292 |
| | | | | 52/588.1 |
| 5,357,725 A * | 10/1994 | Ferry | ................ | E05D 5/023 |
| | | | | 16/222 |
| 5,985,398 A * | 11/1999 | Bellegarde | ............... | B27M 3/04 |
| | | | | 428/54 |
| 6,006,486 A * | 12/1999 | Moriau | .................. | B27F 1/06 |
| | | | | 52/589.1 |
| 6,412,245 B1 * | 7/2002 | Lane | ................ | E04C 3/127 |
| | | | | 52/404.3 |
| 6,468,613 B1 * | 10/2002 | Kitano | .................. | B32B 15/08 |
| | | | | 428/35.8 |
| 6,880,307 B2 * | 4/2005 | Schwitte | ................ | E04F 15/02 |
| | | | | 52/592.1 |
| 7,029,741 B2 | 4/2006 | Sjoberg et al. | | |
| 7,422,787 B2 * | 9/2008 | Evers | .................... | B27N 3/002 |
| | | | | 428/292.4 |
| 7,617,791 B2 * | 11/2009 | Gribble | .................... | B63B 3/48 |
| | | | | 114/357 |
| 7,785,691 B2 * | 8/2010 | Shepard | ............. | A44B 18/0049 |
| | | | | 428/99 |
| 7,842,207 B2 * | 11/2010 | Bosman | ............... | B29C 44/1252 |
| | | | | 264/46.5 |
| 8,201,600 B2 * | 6/2012 | Birkett | .................... | B05D 7/06 |
| | | | | 144/344 |
| 8,591,677 B2 * | 11/2013 | Kipp | ........................ | C04B 14/24 |
| | | | | 156/39 |
| 8,920,876 B2 * | 12/2014 | Vetter | ....................... | E04B 1/00 |
| | | | | 427/261 |
| 9,205,528 B2 * | 12/2015 | Okafuji | ........................ | B24B 9/08 |
| 9,216,541 B2 * | 12/2015 | Boo | ........................ | B29C 66/41 |
| 9,260,864 B2 * | 2/2016 | Cole | ..................... | E04F 13/148 |
| 9,695,600 B2 * | 7/2017 | Vandevoorde | .... | E04F 15/02038 |
| 9,796,107 B2 * | 10/2017 | Bailey | ....................... | B27N 3/04 |
| 10,668,699 B2 * | 6/2020 | Moller | ..................... | E04C 2/322 |
| 2005/0055972 A1 * | 3/2005 | Luty | ..................... | E04B 1/6141 |
| | | | | 52/741.1 |
| 2008/0216421 A1 * | 9/2008 | Chung | ..................... | E04F 11/02 |
| | | | | 52/179 |
| 2010/0236171 A1 * | 9/2010 | Liu | ........................ | E04F 15/02 |
| | | | | 52/309.3 |
| 2016/0312476 A1 * | 10/2016 | Pint | ........................ | E04F 19/061 |
| 2017/0241144 A1 * | 8/2017 | Schlyter Gezelius | .. | E04F 13/10 |
| 2018/0186126 A1 | 7/2018 | Hofer | | |
| 2018/0216353 A1 | 8/2018 | Hannig et al. | | |
| 2018/0266121 A1 | 9/2018 | Meersseman et al. | | |

FOREIGN PATENT DOCUMENTS

| | | | | |
|---|---|---|---|---|
| DE | 102008007355 B4 | 7/2013 | | |
| DE | 202014105181 U1 | 12/2014 | | |
| EP | 24359 A1 * | 3/1981 | ............. | E04F 13/18 |
| EP | 3075923 B1 | 10/2016 | | |
| EP | 2987632 B1 | 3/2018 | | |
| GB | 1160944 A * | 8/1969 | ............. | E04F 13/18 |
| WO | 2004053257 A1 | 6/2004 | | |
| WO | 2008091045 A1 | 7/2008 | | |
| WO | WO-2010072357 A2 * | 7/2010 | ......... | B29C 66/1282 |
| WO | 2016113721 A1 | 7/2016 | | |
| WO | 2017013221 A1 | 1/2017 | | |

* cited by examiner

OSB BOARD AND USE OF THE SAME

CROSS-REFERENCE TO RELATED APPLICATION

This application claims priority to European Patent Application No. 17 196 384.6 filed Oct. 13, 2017, the disclosure of which is hereby incorporated in its entirety by reference.

BACKGROUND OF THE INVENTION

Field of the Invention

The present invention relates to a modified OSB board with a novel connection profile and to the use thereof for wall and/or ceiling paneling.

Description of Related Art

Oriented strand boards, also known as OSB boards, are engineered wood boards produced from long slender strands. OSB boards are increasingly being used in the construction of timber-built and prefabricated houses, because OSB boards are lightweight and nevertheless meet the static requirements with which building boards legally have to comply. Thus, OSB boards are used as building boards and as wall or roof paneling or else in the floor area.

The OSB boards that are used in a wide variety of areas of interior finishing must be fixed to one another when they are laid. Fixing is brought about for example by the formation of a groove, provided along one longitudinal and/or transverse edge, and a tongue, formed on the opposite longitudinal and/or transverse edge, the tongue engaging in the groove (known as a tongue-and-groove connection).

These so-called tongue-and-groove connections are connections that allow a positive-locking engagement of floor panels for example when they are laid in a floating manner. Tongue-and-groove connections engage in one another, and therefore only allow themselves to be pushed or inserted into one another. As a result, holding forces can be transmitted in a horizontal direction from one floor panel to a neighbouring floor panel connected thereto, and any unevenness in the floor can be evened out.

However, laying OSB boards vertically, for example as wall panels, with a tongue-and-groove connection involves the user expending some force, and is consequently impractical.

WO 2017/013221 A1 discloses floor panels which essentially have a modified rebate that allows a good connection of the edges of the panels when they are adhesively bonded, and is consequently also suitable for laying floors in a floating manner. The approach proposed here uses panel edge beveling, which bring about an undercut of the panels. However, panels with such a profiled insert are not suitable for paneling a stud frame structure for producing a wall, because it is also necessary here for the person laying the panels to exert a relatively great force.

In DE 20 2014 105 181 U1, wall panels of a wood material that have a stepped rebate on the narrow sides are used in dry construction.

In addition, to avoid drifting apart of the boards that are connected to one another in such a way, and the accompanying formation of a gap at the joint, the individual OSB boards either have to be additionally glued to one another or have to be fixed by screws on beams or wooden frame structures. This is required in particular in the case of vertical applications.

As mentioned, OSB boards may be used as building boards, in particular in the production of prefabricated houses. For example, for the case where OSB boards are used for wall structures, the wall is produced from a solid wooden frame with corresponding beams, which are covered from both sides with OSB boards. The intermediate space between the frame elements is insulated in a suitable way.

Typically, the side of the wall of the construction that is facing the inner side of the house or building is covered with a plasterboard. However, plasterboards are normally very heavy (density of over 1200 kg/m$^3$) and require knowledge and some effort to be fitted. The surface also requires the application of a layer of plaster and special tools are needed for cutting purposes.

There is correspondingly a need to do without plasterboards for the interior finishing of buildings or to provide alternatives which can be produced and laid with one another in an easy way and can be coated directly, and which overcome the disadvantages of the plasterboards that are conventionally used.

The present invention is therefore based on a technical object of eliminating the aforementioned disadvantages of the known systems, and of providing a simple, but efficient method that enables the user or worker to lay OSB boards easily as wall or ceiling panels without additional costs. Moreover, the OSB boards provided are intended to represent an alternative to the plasterboards that are conventionally used.

SUMMARY OF THE INVENTION

The stated object is achieved according to the invention by an OSB board with the features of the present invention.

Accordingly, an OSB board with at least two board edges lying opposite one another, in particular two opposite longitudinal edges, is provided, wherein the upper side of the OSB board is provided with at least one layer of a cardboard paper;

wherein the board edges respectively on the upper side of the board have a rounding with a radius of between 3 and 10 mm, wherein each of the two opposite board edges has an offset in form of a simple rebate, the rebate in the one board edge complementing the rebate in the opposite board edge, and wherein at least one glue tube in each case is provided in at least one of the opposite offsets of the rebates, in particular in at least one groove According to the invention, at least one glue tube (or glue strip) may be provided in or on at least one of the opposite rebates. Preferably, the at least one glue tube is arranged in at least one groove provided in the rebate. The groove may also be referred to as an insert channel for the glue tube.

For the purposes of the present invention, a rebate should be understood as meaning an offset or a gap in a board (or generally in a body). The rebate (or offset) is respectively provided on the border or edge of the OSB board and allows the OSB boards to be lined up while butting flat against one another. In particular, in the connected state, the complementing rebates provided on the opposite board edges form a step-shaped connection with one another.

A simple rebate can also be described as a straight offset of a predetermined depth and width introduced into the board edge, for example by means of milling. This correspondingly forms an offset (or rebate) in which the edge protrudes in one region of the board with a predetermined width and is set back in another region with a predetermined depth.

In the case of complementing rebates (or offsets), the rebate protrudes in one board edge, for example in the lower region of the board edge, and is set back in an upper region, the opposite board edge having a complementing rebate that protrudes in the upper region of the board edge and is set back in the lower region.

When laying the OSB boards, the rebate according to the invention allows the OSB boards to be easily laid down. For this reason, the OSB boards according to the invention are also good for the paneling of a stud frame structure for producing a wall, by contrast with tongue-and-groove connections, which can only be pushed or inserted into one another.

In one embodiment of the present OSB board, the width of the rebate in the opposite board edges is respectively between 20 and 40 mm, preferably between 25 and 35 mm, particularly preferably 30 mm.

The width of the rebates in the opposite board edges is preferably the same. However, it is generally also conceivable that the width of the rebates in the opposite board edges is different.

In a further embodiment of the present OSB board, the depth of the rebate corresponds to at least a third, preferably at least half, of the thickness of the OSB board. In this case, the thickness of the OSB board may be between 9 and 50 mm, preferably between 10 and 25 mm, in particular 18 mm. Correspondingly, the depth of the rebate in the case where the rebate depth corresponds to half of the board thickness, is between 4.5 and 25 mm, preferably between 5 and 12.5 mm, in particular 9 mm.

The rebate is introduced into the board by means of suitable tools. In particular the wooden board is milled or cut away at the edges.

In a variant, the glue tube is captively fastened on the rebate by spots of adhesive. The opening of the glue tube takes place by pressing together the rebate joint, in particular by the pressure caused by additional mechanical connecting means, such as nails, staples or screws. The mechanical connecting means press the rebates together and even reach into the stud frame structure located behind. The glue tube may be of a perforated design, and a predetermined breaking point is formed in these regions of defined weakening to make opening easier.

As already stated above, the glue tube may also be placed into a groove and optionally fastened captively in the groove by spots of adhesive.

In a preferred embodiment, this groove is only provided in one rebate, in particular in the lower rebate; i.e. in the rebate that can be seen by the user in plan view in the OSB board before laying or adhesive bonding.

It is provided that the at least one groove for the at least one glue tube runs along the entire length of the board edge. The glue tube or the glue contained in the glue tube serves for the adhesive bonding of the rebates as joints of the OSB boards and for providing an air-tight seal at the connection of the respective OSB boards.

It is also provided that the at least one groove for the at least one glue tube is introduced into the surface of the rebate with a radius of between 1 and 5 mm, preferably between 2 and 4 mm, particularly preferably 3 mm. In this case, the groove is milled or sawed into the surface of the rebate, for example by means of a milling cutter or a saw blade in the form of the groove to be introduced. The groove may have a half-round form or else a flatter, oval form. In the case of an oval form of the groove, the cross section of the glue tube would likewise be of an oval design.

It would however also be conceivable that a groove is provided in each of the opposite rebates; i.e. both in the lower rebate and in the complementing upper rebate.

If, on the other hand, a groove is only provided in the lower rebate, the upper rebate can be of a smooth design. This makes production easier.

In a further embodiment, it would however also be conceivable that on the upper rebate there is provided a raised web with alternating symmetrical raised portions, which is arranged so as to complement the groove in the lower rebate. As a result of the forces used or the pressure applied, when opposite rebates are brought together or placed one on top of the other, the alternating symmetrical raised portions bring about the effect of opening or destroying the glue tube placed in the groove. The adhesive is released and distributes itself in the region of the rebate. In a preferred embodiment, the raised portions or elevations on the at least one rebate have a pointedly tapering geometry respectively facing away from the engineered wood board. In this case, the sides of the respective raised portion are preferably of the same length in each case.

The height and angular dimensions between the sides of the preferably pointedly tapering raised portions can be varied according to the thickness of the boards and the geometry of the rebates. Thus, the angular dimensions of the inner angle of the pointedly tapering raised portion may vary, a small inner angle meaning a more pointed raised portion. The size of the angle should be dependent on the material used for the glue tube and the force or pressure to be applied for opening the glue tube. If, for example, a more resistant material is used for the glue tube, the raised portion must be relatively pointed, in order to allow opening of the glue tube. In the converse case, when a softer material is used for the glue tube, a less pointed raised portion is sufficient for opening the glue tube. The raised portions may have a height of 1 to 5 mm, preferably 2 to 4 mm.

It is preferred in particular if the at least one glue tube is formed as a continuous tube, for example in the form of an extruded tube, which contains the glue or adhesive.

In another embodiment of the present OSB board, the at least one glue tube is divided along its length into individual segments or chambers. The segments or chambers are preferably of the same size, that is to say have the same volumes for receiving an equal amount of adhesive. The segments or chambers may be formed by weld seams or so-called sealing points, for example with a width of between 1 and 3 mm, preferably 2 mm. It is also possible for the tube to be divided into segments by using perforation lines, it being possible for the perforation lines to be on the upper side and/or the underside of the glue tube.

In one embodiment, the glue tube has a diameter of between 3 and 10 mm, preferably 5 and 9 mm. The length of an individual segment of the glue tube may be between 100 and 200 mm, preferably between 130 and 180 mm, particularly preferably between 150 and 170 mm.

The use of a glue tube with segments separated from one another by sealing points has various advantages. Thus, when there is damage to the glue tube during transport, storage or use, if there is segmentation then only the adhesive or the glue from the damaged segment escapes, and emptying of the entire glue tube is correspondingly prevented. Furthermore, segmentation of the glue tube also allows the use of different formats of engineered wood boards, since they only have to correspond in format to a multiple of the individual segment length of the glue tube segments (it is possible without any problem for the glue tube to be separated at the sealing point).

In a further embodiment of the present OSB board, the glue tube consists of a plastics material. The plastics material should in this case be chosen such that it has a certain strength, so as to avoid the tube being torn open during production and transport of the OSB board, but to allow it to be opened during the laying of the OSB boards. A particularly preferred plastics material that is used here is polyethylene terephthalate (PET), polyamide (PA) and/or polyethylene (PE) or a mixture thereof. However, any other desired sheet materials or composite sheet materials may also be used for producing the glue tube. In the case of the use of a polyamide sheet material as the tube material, it has a thickness of between 50 and 100 µm, preferably between 70 and 80 µm.

The adhesive that is used in the present case is chosen from the group comprising polyvinyls and acrylates. The use of aqueous adhesive formulations, such as polyvinylacetate (PVAC) or ethylene vinyl acetate (EVA), has proven to be particularly advantageous. It goes without saying that other glues with water as a solvent can also be used. In one embodiment, a PVAC glue with a solids content of between 50 and 80% by weight, preferably between 60 and 79% by weight, particularly preferably of 65% by weight, may be used as the adhesive.

In a further embodiment of the present OSB board, which as a board has of course an upper side and an underside, it is provided that the board edges respectively have on the upper side of the board a rounding with a radius of between 3 and 10 mm, preferably between 5 and 8 mm, particularly preferably between 6 and 7 mm, i.e. the board edges have a corresponding rounding at the protruding and/or set-back region of the rebate. When joining the boards together, the roundings form with one another in the connected state a gap in the surface, which can be filled.

It is likewise provided in a variant that in the region of the rebated connection of two OSB boards there is provided a mechanical connection or fastening, which preferably reaches into the stud of the frame structure onto which the OSB board is fastened. Such a mechanical fastening may take place with nails, screws or staples. A stapling or staple consists of two nails that are connected to one another. The staples are driven into the rebated connection with a pneumatic staple gun.

The profile provided according to the invention in an OSB board has many advantages. For instance, a static effect is achieved by the type of covering and connecting capability. The rounding at the surface of the profile allows the gap between the boards to be filled. The 50/50 scarf joint allows the board to be stapled at the join over the two layers (an at least 30% saving of staples). The groove or insert channel for a glue tube in the rebate profile achieves the effect of a self-gluing and air-tight connection between the OSB boards at the joint. A non-positive bond is provided for uninterrupted surfaces. The OSB boards can be fastened by means of screws or staples on frames provided for this, so that formats equivalent to the height between floors can be created.

In a further, preferred embodiment of the present OSB board, the surface of the OSB board is provided with at least one layer of a paper (in addition to the cardboard paper).

In one variant it may be provided that a first layer of paper is impregnated with at least one resin, in particular a formaldehyde resin. This first layer of paper is, in particular, a layer of paper that is arranged directly on the surface of the OSB. The formaldehyde resin is, in particular, a melamine-formaldehyde resin, urea-formaldehyde resin or melamine-urea-formaldehyde resin.

The paper used for the first layer of paper has a basis weight of between 30 and 200 $g/m^2$, preferably between 50 and 150 $g/m^2$, particularly preferably between 80 and 120 $g/m^2$.

In another variant, a second layer of paper is provided on the first layer of paper, the second layer of paper preferably consisting of a raw (i.e. untreated, non-impregnated) paper. The basis weight of the raw paper of the second layer of paper lies between 30 and 300 $g/m^2$, preferably between 50 and 250 $g/m^2$, particularly preferably between 100 and 120 $g/m^2$. Arranging a raw paper as the outermost layer on an OSB board makes it possible to provide a substrate on which interior wall paint, filler compound or paste for wallpapers can be applied directly.

It is also possible to apply to the second layer of paper hydrophobic components as protection from climatic influences or a thin metal film for reflecting heat.

As mentioned above, according to the invention there is a cardboard paper provided on the upper side of the OSB board. The previously mentioned paper layers may be provided in addition to the cardboard paper on the upper side thereof.

The cardboard paper has a thickness of between 0.5 and 5 mm, preferably between 1 and 4 mm, particularly preferably between 2 and 3 mm. In a variant, the thickness of the cardboard paper may be between 0.8 and 2.6 mm, for example be 1.5 mm.

The cardboard paper is preferably laminated onto the surface of the OSB board before the rebate profile is introduced into the board edges. When laminating relatively thick paperboards or paper-based cardboards, a coat of adhesive is applied to the surface of the OSB and the cardboard is subsequently rolled on the surface. Both the OSB board and the cardboard move through the laminating installation. A linear pressure additionally acts between the rollers, helping to achieve the connection between the OSB board and the cardboard.

It is also generally possible and conceivable that the at least one cardboard paper is pressed with the OSB board in a short-cycle press. In this case, first a resin-coated paper is applied to the surface of the OSB board and then the cardboard paper is laid on that. The paper may be impregnated for example with one or more resins from the group comprising melamine-formaldehyde resin, urea-melamine-formaldehyde resin and phenol-melamine-formaldehyde resin. The subsequent pressing, for example in a short-cycle press at elevated temperatures, causes an initial melting of the resin in the resin-coated paper, which acts as an adhesive agent or adhesive between the surface of the OSB and the cardboard paper.

It is also possible to apply at least one cardboard paper to the OSB board directly during the process of producing it. In this case, after applying the OSB strand to a transporting belt, in the sequence lower top layer-middle top layer-upper top layer, the cardboard paper is laid on the upper top layer on-line as a top coat, and the entire layered structure is pressed under the influence of pressure and temperature.

The coating or laminating of surfaces of OSBs with cardboard paper has many advantages. Applying it to the surface of the board on one side provides a smooth coatable surface with properties similar to a plasterboard or fibre plasterboard, which has the additional properties of a wooden board such as very good fastening possibilities (for example by means of screws or staples) or special dowels.

Such a modified OSB board can be used as a finished surface. The modified OSB boards can also be used for static and air-tight requirements.

The present modified OSB board is used in particular for producing wall and/or ceiling panelling. For this, the present OSB board may be used in various formats.

In a first format, OSB boards with a length of between 2000 and 5000 mm, preferably 2500 mm, and a width of between 600 and 2800 mm, preferably between 625 and 2500 mm, and at the longitudinal edges with the profile according to the invention comprising a simple rebate and a glue tube, are provided. In this format, the end faces are provided with a butt join (i.e. without edge beveling). This OSB board format is used in particular in a height equivalent to the height between floors, with the width of the heating press, and consequently the maximum width of the board, corresponding to the height between floors (of a story) when building. Consequently, the width of the OSB covers the entire height between floors (height of a story). This is usually successful in those buildings in which the load-bearing structure is substantially provided by a wooden stud frame structure—this stud frame structure is then paneled in a statically stiffening manner with the OSBs in question here. Therefore, the OSBs are equivalent to the height between floors, with the OSB boards having a butt join (i.e. without a rebate) along the height between floors. The rebates are then provided on the OSB boards vertically in relation to the height between floors.

In a second format, OSB boards with a length of between 2000 and 3000 mm, preferably 2500 mm, and a width of between 500 and 1000 mm, preferably 625 mm, and at the longitudinal edges with the profile according to the invention comprising a simple rebate and a glue tube, are provided. In this format, the end faces are designed with a known tongue-and-groove profiling, here too a rounding of the board edges preferably being provided. This OSB board format is used in particular as a board for laying.

The present OSB board is likewise used in a method for connecting (or laying) two or more OSB boards with the following features. In this method, a first OSB board with the above features is connected to another (second) OSB board with the above features, the rebate of the first OSB board being placed on the complementing rebate of the further, second OSB board and they are pressed together, the glue tube that is provided in the rebate, and here in particular in the groove, being opened and the glue being released from the glue tube, by the pressing together of the two OSB boards.

The connecting or laying of the OSB boards brings about the formation of a gap between the laid boards, which can be subsequently filled in a known way.

Following the filling, the surface can be processed further by analogy with the conventional plasterboards, for example painting, wallpapering, etc.

BRIEF DESCRIPTION OF THE DRAWINGS

The invention is explained in more detail below with reference to exemplary embodiments that are shown in the figures of the drawings, in which.

DESCRIPTION OF THE INVENTION

Figure 1:
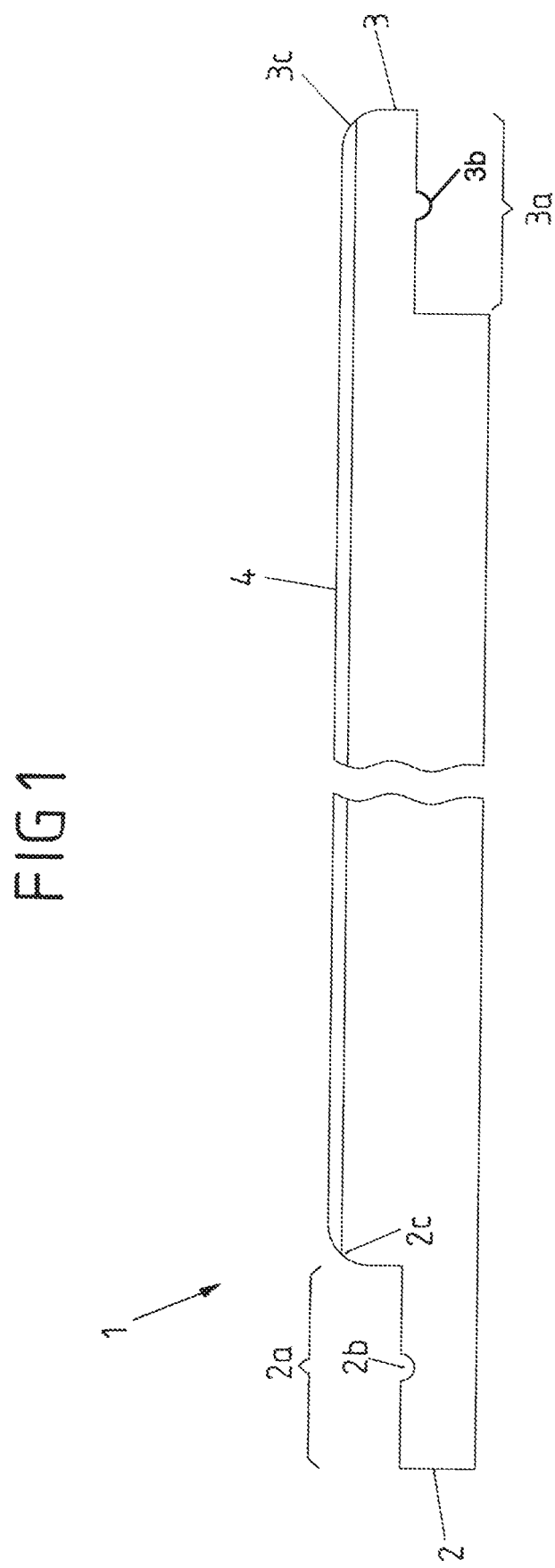
FIG. 1 shows a schematic cross-sectional view of an OSB board according to a first embodiment of the present invention.

FIG. 1 shows a schematic cross-sectional view of an OSB board 1 with a width of between 625 and 2800 mm, which is provided on each of the opposite board edges 2, 3 with a simple rebate 2a, 3a, the two rebates 2a, 3a being formed so as to complement one another.

Correspondingly, the rebate 2a in the board edge 2 protrudes in a lower region of the board edge 2 and is set back in an upper region, whereas in the case of the complementing rebate 3a the upper region of the board edge 3 protrudes and the lower region is set back.

The width of the two rebates 2a, 3a is in each case 30 mm. The depth of the rebate corresponds respectively to half the thickness of the OSB board; i.e., in the case of a board thickness of between 9 and 40 mm, the depth of the rebate is 4.5 to 20 mm.

Provided in the surface of the rebate 2a is a rounded groove 2b as an insert channel for a glue tube or glue strip. The rounded groove 2b has a radius of 3 mm.

Laminated on the upper side of the OSB board 1 is a layer of a cardboard paper 4 with a thickness of between 0.8 and 2.6 mm.

The board edges 2, 3 including the cardboard paper 4 are additionally rounded (radius about 6 mm), with the board edge 2 having the rounding 2c at the set-back region of the rebate 2a and the board edge 3 having the corresponding rounding 3c at the protruding region of the rebate 3a. When joining the boards together, the roundings form with one another in the connected state a gap in the surface, which can be filled. The rebate 3a may have a raised web 3b with alternating symmetrical elevations arranged complimentary to the grooves 2b of the rebate 2a.

Figure 2:
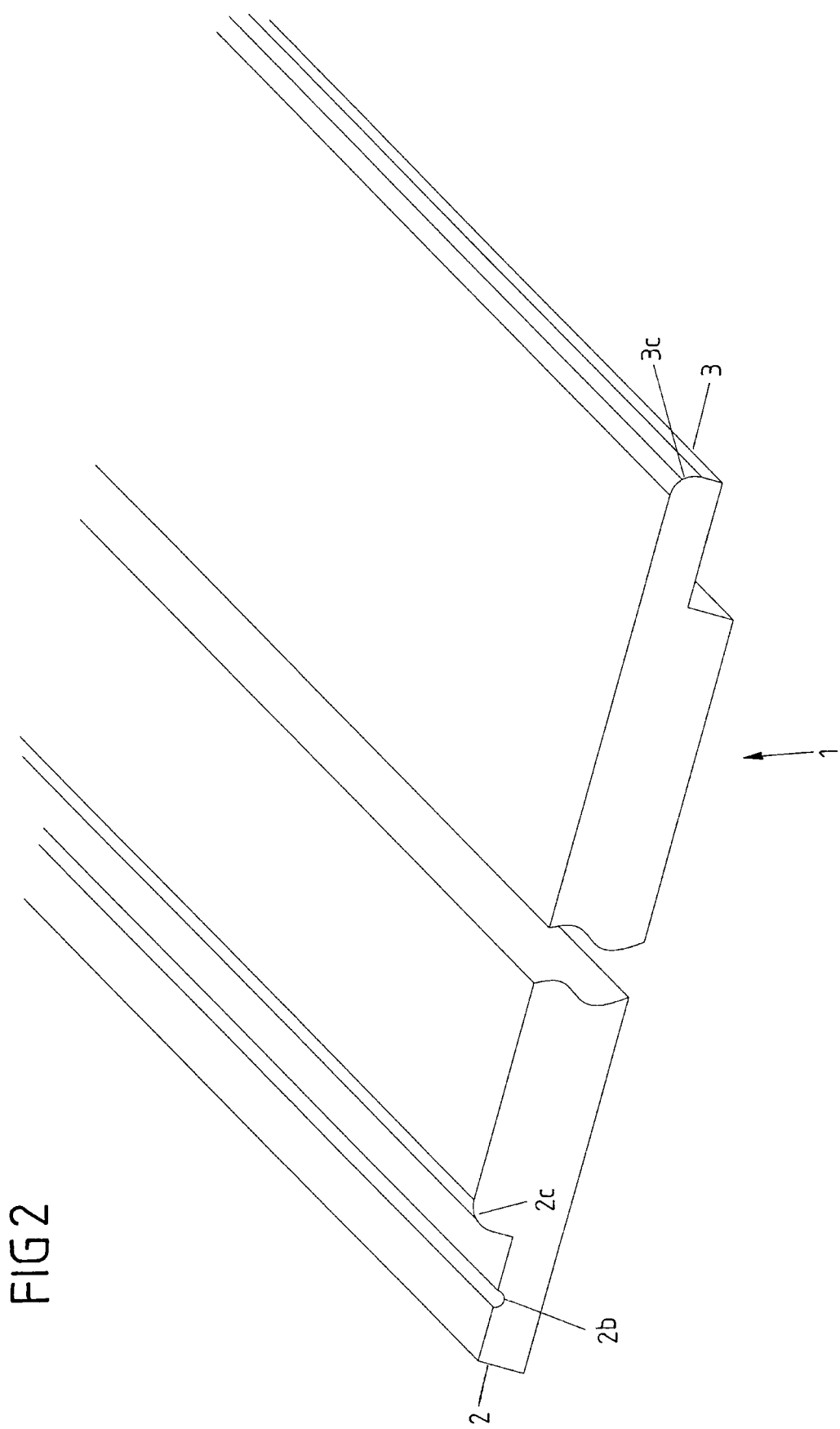
FIG. 2 shows a lateral plan view of the view shown in FIG. 1 of an OSB board according to the invention.

FIG. 2 shows the embodiment of FIG. 1 in a lateral, perspective plan view. For this, the present OSB board can be used in various formats.

Figure 3B:
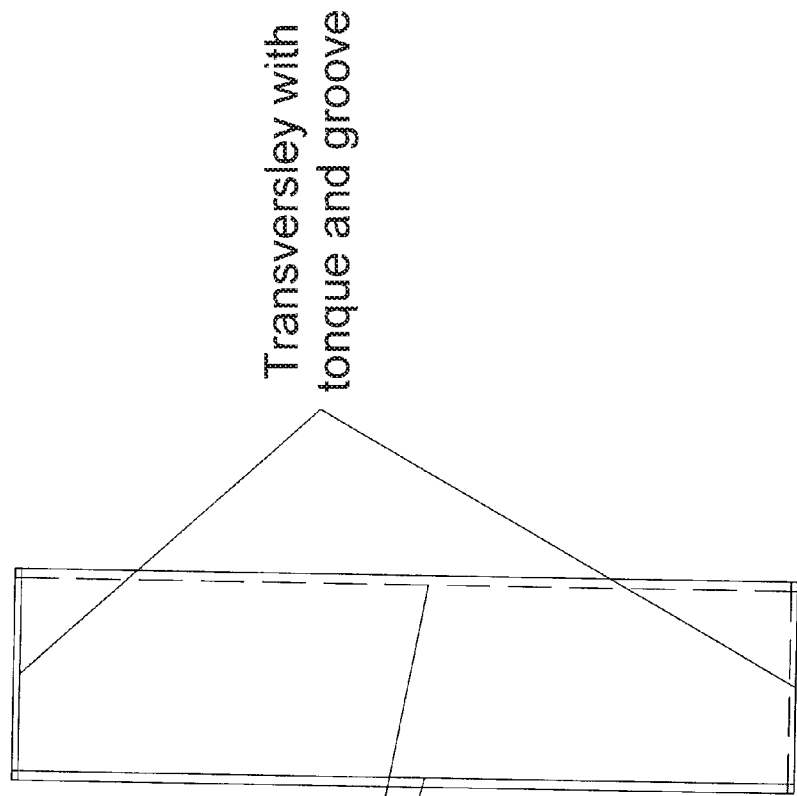
FIG. 3B shows a view of a second laying format of the OSB board according to the invention.
Figure 3A:
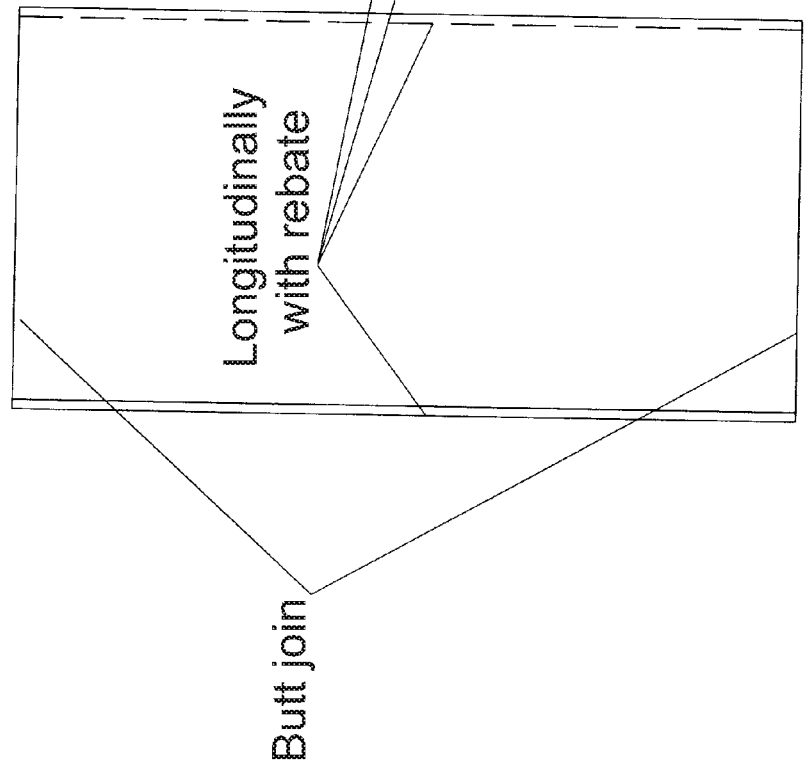
FIG. 3A shows a view of a first laying format of the OSB board according to the invention.

In FIGS. 3A, 3B, two variants of the format of the present OSB boards are shown.

According to a first format (FIG. 3A), an OSB board with a length of 2500 mm and a width of between 625 and 2800 mm, which is provided at the longitudinal edges with the profile according to the invention comprising a simple rebate and a glue tube, is provided. In this format, the end faces are provided with a butt join (i.e. without edging). This OSB board format is used in particular in a height equivalent to the height between floors.

According to a second format (FIG. 3B), OSB boards with a length of 2500 mm and a width of 675 mm, which is likewise provided at the longitudinal edges with the profile according to the invention comprising a simple rebate and a glue tube, are provided. In this format, the end faces are designed with the known tongue-and-groove profiling, a rounding of the board edges preferably also being provided here. This OSB board format is used in particular as a board for laying.

Exemplary Embodiment

An OSB/3 or OSB/4 with a thickness of between 9 and 40 mm, a length of 2500 mm and a width of 1280 mm is first provided in a laminating installation with a paper cardboard with a thickness of 0.8-2.6. It should be pointed out that these formats are only of an exemplary nature, and should not be regarded as limiting.

Subsequently, a simple rebate is introduced along the two longitudinal edges in a milling installation. The rebates have in each case a width of 30 mm and a depth of 10 mm.

The board edges are rounded. This takes place in tongue-and-groove installations, which are correspondingly equipped with tools for this or that profiling by changing them over.

A rounded groove (radius of 3 mm) is introduced into the lower rebate by means of a milling cutter as an insert channel for a glue strip.

A glue tube with a diameter of 9 mm, which consists of divided individual segments with a length of about 169 mm, is placed into the groove. The polyamide sheet material used for the glue tube has a thickness of 70-80 µm. The glue tube is filled with a PVAC glue with a solids content of 65% by weight. Between the segments there is a sealing with a width of about 2 mm.

The invention claimed is:

1. OSB board with at least two board edges lying opposite one another, in particular two opposite longitudinal edges,
    wherein the upper side of the OSB board is provided with at least one layer of a cardboard paper;
    wherein the board edges respectively on the upper side of the board have a rounding with a radius of between 3 and 10 mm,
    wherein each of the two opposite board edges has an offset in a form of a simple rebate, the rebate in the one board edge complementing the rebate in the opposite board edge,
    wherein substantially the entirety of the rebate is a straight offset of a predetermined depth and width introduced into the board edge,
    wherein the rebate in one board edge protrudes in a lower region of the board edge as a lower rebate and the rebate in the opposite board edge protrudes in an upper region as an upper rebate, wherein the lower rebate in the one board edge is complementary to the upper rebate in the opposite board edge; and
    wherein at least one glue tube in each case is provided in at least one of the opposite offsets of the rebates, in particular in at least one groove.

2. The OSB board according to claim 1, wherein a width of the rebate in the opposite board edges is respectively between 20 and 40 mm.

3. The OSB board according to claim 2, wherein the width of the rebate in the opposite board edges is respectively between 25 and 35 mm.

4. The OSB board according to claim 1, wherein a depth of the rebate corresponds to at least a third of a thickness of the OSB board.

5. The OSB board according to claim 4, wherein the depth of the rebate corresponds to at least half of the thickness of the OSB board.

6. The OSB board according to claim 1, wherein at least one groove for the at least one glue tube runs along an entire length of the board edge.

7. The OSB board according to claim 1, wherein at least one groove for the at least one glue tube is introduced into the surface of the rebate with a radius of between 1 and 5 mm.

8. The OSB board according to claim 7, wherein the surface of the rebate has a radius between 2 and 4 mm.

9. The OSB board according to claim 1, wherein the at least one glue tube is a continuous tube or a tube that is divided along its length into individual segments.

10. The OSB board according to claim 1, wherein the board edges respectively on the upper side of the board have a rounding with a radius of between 5 and 8 mm.

11. The OSB board according to claim 10, wherein the rounding has a radius between 6 and 7 mm.

12. The OSB board according to claim 1, wherein a stapling can be performed in complementing overlapping rebates of the board edges.

13. The OSB board according to claim 1, wherein the cardboard paper has a thickness of between 0.5 and 5 mm.

14. The OSB board according to claim 13, wherein the cardboard paper has a thickness between 1 and 4 mm.

15. The OSB board according to claim 13, wherein the cardboard paper has a thickness between 2 and 3 mm.

16. A method for providing the OSB board according to claim 1.

17. A method for connecting a first OSB board according to claim 1 with a second OSB board, wherein the rebate of the first OSB board is placed onto a complementing rebate of the second OSB board and pressed together, wherein the glue tube that is provided in a respective groove of the rebate is opened and the glue released from the glue tube by the pressing together of the first and second OSB boards.

18. The method according to claim 17, wherein a gap formed by the connecting of the first and second OSB boards is filled.

19. The OSB board according to claim 1, wherein the at least two board edges lying opposite one another are two opposite longitudinal edges.

20. The OSB board according to claim 1, wherein the at least one glue tube is provided in at least one groove of the at least one opposite offsets of the rebates.

21. The OSB board according to claim 1, wherein the rebate is a straight offset of a predetermined depth and width introduced into the board edge.

22. An OSB board having at least two opposite board edges, in particular two opposite longitudinal edges,
    each of the two opposite board edges having an offset in a form of a simple rebate,
    wherein the rebate in one board edge protrudes in a lower region of the board edge as a lower rebate and the rebate in the opposite board edge protrudes in an upper region as an upper rebate, wherein the lower rebate in the one plate edge is complementary to the upper rebate in the opposite board edge;
    wherein substantially the entirety of the rebate is a straight offset of a predetermined depth and width introduced into the board edge,
    wherein the rebate in one board edge protrudes in a lower region of the board edge as a lower rebate and the rebate in the opposite board edge protrudes in an upper region as an upper rebate, wherein the lower rebate in the one board edge is complementary to the upper rebate in the opposite board edge; and
    wherein at least one groove for receiving at least one glue tube is provided in the lower rebate and a raised web with alternating symmetrical elevations is provided on the upper rebate, wherein the web is arranged complementary to the groove in the lower rebate.

23. The OSB board according to claim 22, wherein the elevations of the web on the upper rebate have a pointedly tapering geometry respectively facing away from the engineered wood board.

24. The OSB board according to claim 22, wherein the sides of the respective elevation are each of preferred equal length.

25. The OSB board according to claim 22, wherein the elevations have a height of 1 to 5 mm.

26. The OSB board according to claim 22, wherein the upper side of the board of the OSB board is provided with at least one layer of a cardboard paper.

27. The OSB board according to claim 26, wherein the cardboard paper has a thickness between 0.5 and 5 mm.

\* \* \* \* \*